US012705070B2

(12) United States Patent
Xu

(10) Patent No.: US 12,705,070 B2
(45) Date of Patent: Aug. 11, 2026

(54) METHOD, APPARATUS, COMPUTER DEVICE, AND STORAGE MEDIUM FOR OPTIMIZING STARTUP OF APPLICATION

(71) Applicant: Beijing Bytedance Network Technology Co., Ltd., Beijing (CN)

(72) Inventor: Shuangqing Xu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 120 days.

(21) Appl. No.: 18/718,946

(22) PCT Filed: Mar. 29, 2023

(86) PCT No.: PCT/CN2023/084619
§ 371 (c)(1),
(2) Date: Jun. 12, 2024

(87) PCT Pub. No.: WO2023/197866
PCT Pub. Date: Oct. 19, 2023

(65) Prior Publication Data

US 2024/0419459 A1 Dec. 19, 2024

(30) Foreign Application Priority Data

Apr. 14, 2022 (CN) ........................ 202210389434.X

(51) Int. Cl.
*G06F 9/445* (2018.01)
*G06F 9/50* (2006.01)

(52) U.S. Cl.
CPC ........ *G06F 9/44578* (2013.01); *G06F 9/5038* (2013.01)

(58) Field of Classification Search
CPC ..... G06F 9/44578; G06F 9/5038; G06F 1/329
See application file for complete search history.

(56) References Cited

U.S. PATENT DOCUMENTS 11,347,554 B1 * 5/2022 Kotelnikova ......... G06F 9/4881
2006/0294522 A1 * 12/2006 Havens ................ G06F 9/4887 718/103

(Continued)

FOREIGN PATENT DOCUMENTS

CN 108089935 A 5/2018
CN 113728312 A 11/2021

(Continued)

OTHER PUBLICATIONS

Rejection Decision for Chinese Application No. 202210389434.X, mailed Oct. 31, 2024, 8 Pages.

(Continued)

*Primary Examiner* — Hyun Soo Kim
(74) *Attorney, Agent, or Firm* — Alleman Hall LLP

(57) ABSTRACT

The embodiments of the present disclosure provide a method, an apparatus, a computer device and a storage medium for optimizing startup of an application. The method comprises obtaining initial codes of an application to be optimized for being deployed in a target operating system, wherein the initial codes include a first priority parameter corresponding to at least one asynchronous thread task, the asynchronous thread task is other thread task executed upon startup of the application to be optimized other than a main thread task, and the first priority parameter characterizes a priority order for allocating computing resources; determining, in the at least one asynchronous thread task, a target thread task irrelevant to display of a startup page of the application to be optimized; and adjusting the first priority parameter corresponding to the target thread task to obtain target codes of an optimized target application.

14 Claims, 2 Drawing Sheets

(56) References Cited

U.S. PATENT DOCUMENTS

| | | | | |
|---|---|---|---|---|
| 2007/0248288 | A1 | 10/2007 | Nagao et al. | |
| 2014/0359632 | A1 * | 12/2014 | Kishan | G06F 9/4881 718/103 |
| 2016/0055029 | A1 * | 2/2016 | Raman | G06F 8/458 718/106 |
| 2020/0341805 | A1 * | 10/2020 | Kim | G06F 9/4881 |
| 2021/0191757 | A1 | 6/2021 | Tsirkin | |
| 2023/0367616 | A1 * | 11/2023 | Zheng | G06F 8/38 |

FOREIGN PATENT DOCUMENTS

| | | | |
|---|---|---|---|
| CN | 114035926 | A | 2/2022 |
| CN | 114327685 | A | 4/2022 |
| CN | 114721742 | A | 7/2022 |

OTHER PUBLICATIONS

ISA China National Intellectual Property Administration, International Search Report Issued in Application No. PCT/CN2023/084619, Jun. 21, 2023, WIPO, 6 pages.

China National Intellectual Property Administration, Office Action and Search Report Issued in Application No. 202210389434.X, Dec. 30, 2023, 1 page.

* cited by examiner

METHOD, APPARATUS, COMPUTER DEVICE, AND STORAGE MEDIUM FOR OPTIMIZING STARTUP OF APPLICATION

The application is a U.S. National Stage Application of PCT International Application No. PCT/CN2023/084619, filed on Mar. 29, 2023, which claims the priority from the CN patent application No. 202210389434.X filed with the China National Intellectual Property Administration on Apr. 14, 2022 and entitled "APPLICATION STARTING OPTIMIZATION METHOD AND APPARATUS, COMPUTER DEVICE, AND STORAGE MEDIUM," the disclosures of which are incorporated herein by reference in their entireties.

FIELD

The present disclosure relates to a computer technology field, and more specifically to a method, an apparatus, a computer device and a storage medium for optimizing startup of an application.

BACKGROUND

With rapid development of Internet technology, an increasing number of applications appear on the terminal devices of the users. When using an application, the speed for initiating this application is a crucial part for user experience.

In the related art, developers may choose to utilize as many hardware resources as possible in the terminal device to execute a startup task of the application, so as to increase the starting speed of the application. However, terminal devices of some users have limited hardware resources, so the starting speed of the application can only be boosted by a limited margin. In such case, how to optimize the startup of the application has become a problem to be solved by those skilled in the art.

SUMMARY

Embodiments of the present disclosure at least provide a method, an apparatus, a computer device and a storage medium for optimizing startup of an application.

In one aspect, embodiments of the present disclosure provide a method for optimizing startup of an application, comprising:

obtaining initial codes of an application to be optimized for being deployed in a target operating system, wherein the initial codes include a first priority parameter corresponding to at least one asynchronous thread task, the asynchronous thread task is other thread task executed upon startup of the application to be optimized other than a main thread task, and the first priority parameter characterizes a priority order for allocating computing resources;

determining, in the at least one asynchronous thread task, a target thread task irrelevant to display of a startup page of the application to be optimized;

adjusting the first priority parameter corresponding to the target thread task to obtain target codes of an optimized target application.

In one possible implementation, the initial codes also include a second priority parameter corresponding to the main thread task, and wherein a priority order corresponding to a parameter value of the second priority parameter is higher than a priority order corresponding to a parameter value of the first priority parameter.

In one possible implementation, determining, in the at least one asynchronous thread task, a target thread task irrelevant to display of a startup page of the application to be optimized comprises:

determining, for each of the at least one asynchronous thread task, a first startup result corresponding to the startup of the application to be optimized in a case of the asynchronous thread task being executed; and determining a second startup result corresponding to the startup of the application to be optimized in a case of this asynchronous thread task being not executed, wherein the first startup result and the second startup result characterize a speed for displaying the startup page;

determining, based on a first startup result and a second startup result corresponding to each of the at least one asynchronous thread task, the target thread task in the at least one asynchronous thread task.

In one possible implementation, the determining, in the at least one asynchronous thread task, a target thread task irrelevant to display of a startup page of the application to be optimized includes:

in response to a select instruction for the target thread task in the at least one asynchronous thread task, determining the target thread task in the at least one asynchronous thread task.

In one possible implementation, adjusting the first priority parameter corresponding to the target thread task comprises:

adjusting a parameter value of the first priority parameter corresponding to the target thread task from a first target parameter value to a second target parameter value, wherein a priority order corresponding to the second target parameter value is lower than that of the first target parameter value.

In one possible implementation, determining, based on a first startup result and a second startup result corresponding to each of the at least one asynchronous thread task, the target thread task in the at least one asynchronous thread task includes:

determining, based on the first startup result and the second startup result corresponding to each of the at least one asynchronous thread task, the target thread task in the at least one asynchronous thread task and target impact information corresponding to the target thread task, wherein the target impact information characterizes a degree of impact of the target thread task on the application to be optimized;

wherein adjusting the first priority parameter corresponding to the target thread task to obtain target codes of an optimized target application comprises:

adjusting, based on the target impact information corresponding to respective target thread task, the first priority parameter corresponding to respective target thread task to obtain target codes of the optimized target application.

In one possible implementation, the target operating system is an iOS operating system, the computing resource is a time slice, and the first priority parameter is a Quality of Service parameter.

In a second aspect, embodiments of the present disclosure also provide an apparatus for optimizing startup of an application, comprising:

an obtaining module for obtaining initial codes of an application to be optimized for being deployed in a target operating system; wherein the initial codes include a first priority parameter corresponding to at least one asynchronous thread task, the asynchronous thread task is other thread task executed upon startup of the application to be optimized other than a main thread task, and the first priority parameter characterizes a priority order for allocating computing resources;

a determination module for determining, in the at least one asynchronous thread task, a target thread task irrelevant to display of a startup page of the application to be optimized;

an adjustment module for adjusting the first priority parameter corresponding to the target thread task to obtain target codes of an optimized target application.

In one possible implementation, the initial codes also include a second priority parameter corresponding to the main thread task, and wherein a priority order corresponding to a parameter value of the second priority parameter is higher than a priority order corresponding to a parameter value of the first priority parameter.

In one possible implementation, when determining, in the at least one asynchronous thread task, a target thread task irrelevant to display of a startup page of the application to be optimized, the determination module is used for:

for each of the at least one asynchronous thread task, determining a first startup result corresponding to the startup of the application to be optimized in a case of this asynchronous thread task being executed; and determining a second startup result corresponding to the startup of the application to be optimized in a case of this asynchronous thread task being not executed, wherein the first startup result and the second startup result characterize a speed for displaying the startup page;

determining, based on a first startup result and a second startup result corresponding to each of the at least one asynchronous thread task, the target thread task in the at least one asynchronous thread task.

In one possible implementation, when determining, in the at least one asynchronous thread task, a target thread task irrelevant to display of a startup page of the application to be optimized, the determination module is used for:

in response to a select instruction for the target thread task in the at least one asynchronous thread task, determining the target thread task in the at least one asynchronous thread task.

In one possible implementation, when adjusting the first priority parameter corresponding to the target thread task, the adjustment module is used for:

adjusting a parameter value of the first priority parameter corresponding to the target thread task from a first target parameter value to a second target parameter value, wherein a priority order corresponding to the second target parameter value is lower than that of the first target parameter value.

In one possible implementation, when determining, based on a first startup result and a second startup result corresponding to each of the at least one asynchronous thread task, the target thread task in the at least one asynchronous thread task, the determination module is used for:

determining, based on the first startup result and the second startup result corresponding to each of the at least one asynchronous thread task, the target thread task in the at least one asynchronous thread task and target impact information corresponding to the target thread task, wherein the target impact information characterizes a degree of impact of the target thread task on the application to be optimized;

wherein when adjusting the first priority parameter corresponding to the target thread task to obtain target codes of an optimized target application, the adjustment module is used for:

adjusting, based on the target impact information corresponding to respective target thread task, the first priority parameter corresponding to respective target thread task to obtain target codes of the optimized target application.

In one possible implementation, the target operating system is an iOS operating system, the computing resource is a time slice, and the first priority parameter is a Quality of Service parameter.

In a third aspect, embodiments of the present disclosure also provide a computer device, comprising: a processor, a memory and a bus; wherein the memory stores machine-readable instructions executable by the processor; during operation of a computer device, the processor communicates with the memory through a bus; and the machine-readable instructions, when executed by the processor, perform the above first aspect, or steps in any possible implementations according to the first aspect.

In a fourth aspect, embodiments of the present disclosure provide a computer-readable storage medium stored thereon with computer programs which, when executed by a processor, perform the above first aspect, or steps in any possible implementations according to the first aspect.

In a fifth aspect, embodiments of the present disclosure also provide a computer program product carrying program codes, where instructions included in the program codes are used to perform the above first aspect, or steps in any possible implementations according to the first aspect.

Embodiments of the present disclosure provide a method, an apparatus, a computer device, and a storage medium for optimizing startup of an application. By determining, in the initial codes of the application to be optimized, a target thread task irrelevant to display of a startup page of the application to be optimized, a first priority parameter corresponding to the target thread task may be adjusted and the target thread task irrelevant to the startup page of the application to be optimized would preempt fewer computing resources during the startup phase of the application to be optimized. As such, more computing resources are allocated for main thread tasks and the corresponding starting speed of the application to be optimized also increases, thereby obtaining target codes of an optimized target application.

The above objectives, characteristics and advantages of the embodiments of the present disclosure will be more easily understood by listing the following possible embodiments. Detailed description of the possible embodiments is also provided below with reference to the accompanying drawings.

BRIEF DESCRIPTION OF THE DRAWINGS

To describe the technical solutions in the embodiments of the present disclosure more clearly, the drawings to be used in the embodiments are briefly introduced below. The drawings here are incorporated into the description as a part of it. These drawings illustrate embodiments according to the present disclosure and further explain the technical solutions of the present application in combination with the description. It is to be understood that the following drawings only illustrate some embodiments of the present disclosure and shall not be regarded as limitations over the scope. Those skilled in the art also may obtain other related drawings from the illustrated ones without any exercises of inventive work.

DETAILED DESCRIPTION OF EMBODIMENTS

Figure 1:
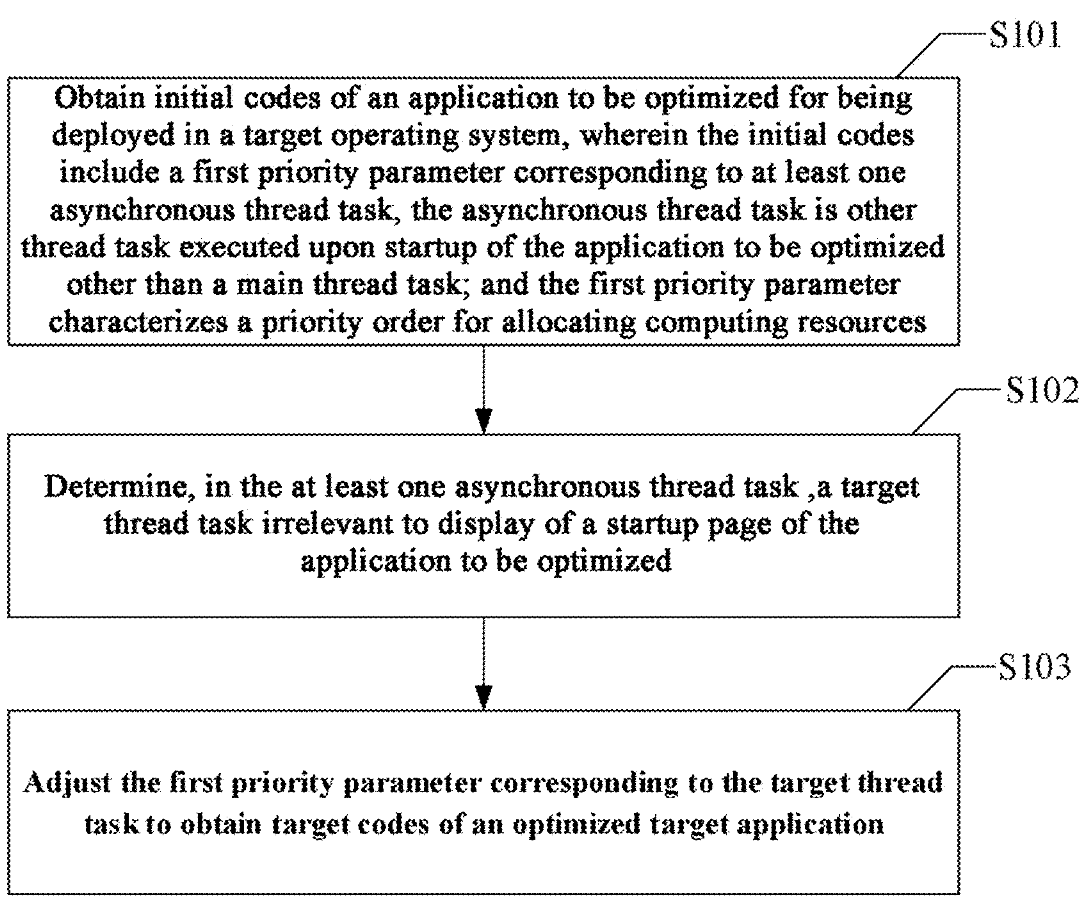
FIG. 1 illustrates a flowchart of a method for optimizing startup of an application provided by embodiments of the present disclosure.

For a clearer picture of the objectives, technical solutions and advantages of the embodiments of the present disclosure, the technical solutions in the embodiments of the present disclosure are to be described clearly and completely with reference to the drawings in the embodiments of the present disclosure. It is obvious that the described embodiments are only part of the embodiments of the present disclosure, rather than all of them. In general, components of the embodiments of the present disclosure described and illustrated here may be arranged and designed by various configurations. Thus, the following detailed description of the embodiments of the present disclosure provided in the drawings is not intended to restrict the protection scope of the present disclosure. It is merely a description of the selected embodiments of the present disclosure. All other embodiments obtained by those skilled in the art on the basis of the illustrated embodiments of the present disclosure without any exercises of inventive work fall within the protection scope of the present disclosure.

It is to be noted: similar reference signs and letters indicate similar items in the following drawings. Therefore, once an item is defined in a drawing, no further definitions and explanations are required in the subsequent drawings.

The term "and/or" here only describes an association and suggests three relations. For example, A and/or B may indicate three scenarios, including A alone, both A and B and B alone. In addition, the term "at least one" here indicates any one of the many or any combinations of at least two of the many. For instance, when the present disclosure discloses including at least one of A, B and C, it means selecting any one or more elements from the group consisting of A, B and C.

It is investigated by research that developers may choose to utilize as many hardware resources as possible in the terminal device to execute a startup task of the application, so as to increase the starting speed of the application. However, terminal devices of some users have limited hardware resources, so the starting speed of the application can only be boosted by a limited margin. In such case, how to optimize the application startup has become a problem to be solved by those skilled in the art.

Besides, for terminal devices with restricted hardware resources, developers also may postpone the execution of thread tasks irrelevant to the startup task upon the startup of the application. In other words, the thread tasks are executed after the startup of the application is completed. To fulfill this, developers are required to have a thorough understanding of service logic of the application, to be able to identify which codes of the codes related to the application is irrelevant to the startup task and complete the delayed execution of the related thread tasks on the basis of the modifications of the codes. Since the different applications are analyzed and code-modified separately, the entire solution has high time and labor costs and is inefficient.

Based on the above research, embodiments of the present disclosure provide a method, apparatus, a computer device and a storage medium for optimizing startup of an application. By determining, in the initial codes of the application to be optimized, a target thread task irrelevant to display of a startup page of the application to be optimized, a first priority parameter corresponding to the target thread task may be adjusted and the target thread task irrelevant to the startup page of the application to be optimized would preempt fewer computing resources during the startup phase of the application to be optimized. As such, more computing resources are allocated for main thread tasks and the corresponding starting speed of the application to be optimized also increases, thereby obtaining target codes of an optimized target application.

To easily understand this embodiment, a method for optimizing startup of an application disclosed by embodiments of the present disclosure is first introduced in details. The method for optimizing startup of an application provided by embodiments of the present disclosure is generally executed by a computer device with certain computing capacity. The computer device, for example, includes: terminal device, or server or other processing devices. The terminal device may be User Equipment, mobile device, user terminal, terminal, cellular phone, cordless telephone, Personal Digital Assistant (PDA), hand-held device, computing device, on-board device and wearable device etc. In some possible implementations, the method for optimizing startup of an application may be implemented by calling computer-readable instructions stored in the memory through a processor.

FIG. 1 illustrates a flowchart of a method for optimizing startup of an application provided by embodiments of the present disclosure. The method comprises S101-S103, wherein:

S101: obtaining initial codes of an application to be optimized for being deployed in a target operating system, wherein the initial codes include a first priority parameter corresponding to at least one asynchronous thread task, the asynchronous thread task is other thread task executed upon startup of the application to be optimized other than a main thread task, and the first priority parameter characterizes a priority order for allocating computing resources;

S102: determining, in the at least one asynchronous thread task, a target thread task irrelevant to display of a startup page of the application to be optimized;

S103: adjusting the first priority parameter corresponding to the target thread task to obtain target codes of an optimized target application The detailed description of the above steps is provided below.

For S101, the target operating system may be iOS; the computing resources may be time slices in CPU resources, the time slice indicating a period of CPU time assigned to each running progress at microscopic level (e.g., thread) by a time-sharing operating system; and the first priority parameter may be Quality of Service (QOS) parameter.

Specifically, a main thread is a thread for rendering a user interface of the application to be optimized and the main thread task refers to a thread task related to the main thread; asynchronous threads are other threads except for the main thread and the asynchronous thread tasks refer to other thread tasks in the multithreaded task other than the main thread task and are associated with asynchronous threads; the main thread task and the asynchronous thread tasks may be executed asynchronously.

In addition, the initial codes also include a second priority parameter corresponding to the main thread task; wherein a priority order corresponding to a parameter value of the second priority parameter is higher than a priority order corresponding to a parameter value of the first priority parameter.

As an example, the target operating system is iOS and the first priority parameter and the second priority parameter are Quality of Service parameters. In this example, parameter value of the Quality of Service parameter may include User-interactive, User-initiated, Utility and Background; priority orders corresponding to respective parameter values decrease in turn; computing resource allocation ratio corresponding to different priority orders may vary, and the computing resource ratios corresponding to respective parameter values may be 40%, 30%, 20% and 10% separately; a parameter value of the second priority parameter may be User-interactive with highest priority order, and a parameter value of the first priority parameter may be User-initiated with a priority order lower than the highest priority order of User-interactive by one level.

S102: determining, in the at least one asynchronous thread task, a target thread task irrelevant to display of a startup page of the application to be optimized.

Here, the startup page of the application to be optimized may be a home page of the application to be optimized. After the application to be optimized is initiated by a trigger operation, the startup of the application to be optimized is determined as completed until the home page is displayed.

Specifically, the target thread task irrelevant to display of a startup page of the application to be optimized is determined by any one of:

Approach 1: determining the target thread task in response to a select instruction for the target thread task.

Here, in response to a select instruction for a target thread task in the at least one asynchronous thread task, a target thread task may be determined in the at least one asynchronous thread task.

As an example, when the asynchronous thread tasks include asynchronous thread task 1, asynchronous thread task 2, asynchronous thread task 3, asynchronous thread task 4 and asynchronous thread task 5, the asynchronous thread task 1 may be determined as the target thread task in response to a select instruction for the asynchronous thread task 1.

Approach 2: determining the target thread task based on startup results corresponding to respective asynchronous thread tasks.

Here, in case that the target thread task is determined based on startup results corresponding to respective asynchronous thread tasks, the following steps A1-A2 may be adopted:

A1: for any one of the asynchronous thread tasks, determining a first startup result corresponding to startup of the application to be optimized when this asynchronous thread task is executed; and determining a second startup result corresponding to startup of the application to be optimized when this asynchronous thread task is not executed; wherein the first startup result and the second startup result characterize a speed for displaying the startup page;

A2: determining, based on a first startup result and a second startup result corresponding to each of the asynchronous thread tasks, a target thread task in the at least one asynchronous thread task.

Here, in order to decide whether the respective asynchronous thread tasks are related to the startup page of the application to be optimized, it is determined whether the execution of respective asynchronous thread tasks affects the speed for displaying the startup page of the application to be optimized by controlling variables.

Specifically, when the target thread task in the at least one asynchronous thread task is determined based on a first startup result and a second startup result respectively corresponding to each of the asynchronous thread tasks, the following steps A21-A22 may be used:

A21: for any one of the asynchronous thread tasks, a startup impact result corresponding to the asynchronous thread task is determined based on the first startup result and the second startup result corresponding to this asynchronous thread task.

A22: the target thread task in the at least one asynchronous thread task is determined on the basis of the startup impact result and the preset threshold respectively corresponding to each asynchronous thread task.

Here, the preset threshold may be a preset time threshold, e.g., 100 ms etc.

Specifically, when the startup impact result is determined on the basis of the first startup result and the second startup result, a difference between the first startup result and the second startup result may be taken as a value of the startup impact result.

For each of the asynchronous thread tasks, if the startup impact result corresponding to the asynchronous thread task is greater than the preset threshold, the asynchronous thread task may be determined as the target thread task.

As an example, for asynchronous thread task 1, when it is executed, the first startup result corresponding to the startup of the application to be optimized is 800 ms; when the asynchronous thread task 1 is not executed, the second startup result corresponding to the startup of the application to be optimized is 500 ms. Accordingly, it is determined that the startup impact result corresponding to the asynchronous thread task 1 is 300 ms, which is greater than the preset threshold (i.e., 100 ms). The asynchronous thread task 1 is thus determined as the target thread task.

Moreover, it is possible that the asynchronous thread task is a thread task that has to be executed during the startup of the application to be optimized. Therefore, when the asynchronous thread task is not executed, the second startup result corresponding to the startup of the application to be optimized may be startup failure. At this moment, the corresponding asynchronous thread task may be determined as the thread task that has to be executed, i.e., this asynchronous thread task is not optimized.

Before determining the startup impact results corresponding to respective asynchronous thread tasks, the asynchronous thread tasks may also be screened based on a preset screening condition, to cut down the subsequent computation. The screening condition, for example, may be whether the asynchronous thread task calls/multiplexes preset code fields related to page display; if not, the corresponding asynchronous thread task fails to pass the screening and will not participate in the following calculation of the startup impact result.

S103: adjusting the first priority parameter corresponding to the target thread task to obtain target codes of an optimized target application.

Here, adjustment of the first priority parameter corresponding to the target thread task may refer to tuning the first priority parameter corresponding to the target thread task; and/or tuning the first priority parameter of the thread and/or task sequence corresponding to the target thread task. The effect of adjusting the first priority parameter of the thread and/or task sequence corresponding to the target thread task is identical to that achieved by directly adjusting the first priority parameter corresponding to the target thread task, i.e., the computing resources can be allocated in accordance with parameter values of the adjusted priority parameters upon execution of the target thread task.

Specifically, the target thread task irrelevant to display of the startup page of the application to be optimized may be determined by any one of the approaches below:

Approach 1: the priority order of the first parameter value corresponding to the first priority parameter is decreased in accordance with a preset reduction amplitude.

Accordingly, the parameter value of the first priority parameter corresponding to the target thread task may be adjusted from the first target parameter value to the second target parameter value in accordance with the reduction amplitude; wherein the corresponding priority order of the second target parameter value is lower than that of the first target parameter value.

Continuing with the above example where the target operating system is iOS and the first priority parameter and the second priority parameter are Quality of Service parameters, the parameter value of the first priority parameter corresponding to the target thread task may be adjusted from User-initiated to Utility in accordance with the preset reduction amplitude; alternatively, the parameter value of the first priority parameter corresponding to the target thread task may be adjusted from User-initiated to Background.

Approach 2: the first priority parameter corresponding to each of the target thread tasks is adjusted based on the target impact information corresponding to each of the target thread tasks.

Specifically, in order to adjust the first priority parameter corresponding to each of the target thread tasks based on the target impact information corresponding to each of the target thread tasks, the following steps B1-B2 may be adopted:

B1: determining, based on a first startup result and a second startup result corresponding to each of the asynchronous thread tasks, a target thread task in the at least one asynchronous thread task and target impact information corresponding to the target thread task; wherein the target impact information characterizes a degree of impact of each target thread task on the application to be optimized.

Here, the target impact information may be determined in accordance with the startup impact result and the preset impact threshold.

B2: adjusting, based on target impact information corresponding to each target thread task, a first priority parameter corresponding to each target thread task to obtain target codes of an optimized target application.

As an example, the impact threshold is 200 ms. If the startup impact result corresponding to the asynchronous thread task 1 is 300 ms, which is greater than the preset threshold of 100 ms, it is determined that the asynchronous thread task 1 is the target thread task to be optimized. Then, since 300 ms is greater than 200 ms, it is determined that the asynchronous thread task 1 has a great impact on the application to be optimized and a big adjustment is required. Accordingly, the parameter value of the first priority parameter corresponding to the asynchronous thread task 1 may be adjusted from User-initiated to Background (i.e., down-regulated by two levels). In case that the startup impact result corresponding to the asynchronous thread task 2 is 150 ms, which is greater than the preset threshold of 100 ms, it is determined that the asynchronous thread task 2 is the target thread task to be optimized. After that, because 150 ms is smaller than 200 ms, it is determined that the asynchronous thread task 2 has a small impact on the application to be optimized and a slight adjustment is required. Thus, the parameter value of the first priority parameter corresponding to the asynchronous thread task 2 may be adjusted from User-initiated to Utility (i.e., down-regulated by one level).

In the method for optimizing startup of an application provided by embodiments of the present disclosure, by determining, in the initial codes of the application to be optimized, a target thread task irrelevant to display of a startup page of the application to be optimized, a first priority parameter corresponding to the target thread task may be adjusted and the target thread task irrelevant to the startup page of the application to be optimized would preempt fewer computing resources during the startup phase of the application to be optimized. As such, more computing resources are allocated for main thread tasks and the corresponding starting speed of the application to be optimized also increases, thereby obtaining target codes of an optimized target application.

Those skilled in the art may appreciate that although the respective steps are drafted in a given order in the above method of the specific implementations, it does not mean the steps should be strictly executed in such order. Instead the drafting order makes no limitations over the implementation process. The specific execution order of the respective steps should be determined by their functions and possible internal logic.

On the basis of the same inventive concept, embodiments of the present disclosure also provide an apparatus for optimizing startup of an application corresponding to the method for optimizing startup of applications. Because the principle followed by the apparatus in the embodiments of the present disclosure is similar to the above method for optimizing startup of applications according to the embodiments of the present disclosure, the implementation of the apparatus may refer to how the method is implemented and the same contents will not be repeated here.

Figure 2:
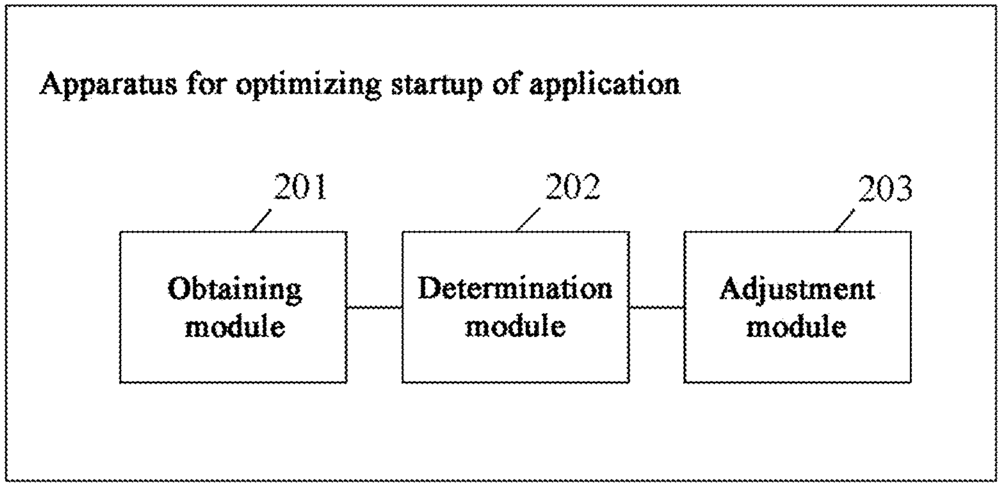
FIG. 2 illustrates an architecture diagram of an apparatus for optimizing startup of an application provided by embodiments of the present disclosure.

FIG. 2 illustrates an architecture diagram of an apparatus for optimizing startup of an application provided by embodiments of the present disclosure. The apparatus comprises: an obtaining module 201, a determination module 202 and an adjustment module 203; wherein,

- an obtaining module 201 is provided for obtaining initial codes of an application to be optimized deployed in a target operating system, wherein the initial codes include a first priority parameter corresponding to at least one asynchronous thread task, the asynchronous thread task is other thread task executed upon startup of the application to be optimized other than a main thread task, and the first priority parameter characterizes a priority order for allocating computing resources;
- a determination module 202 is provided for determining a target thread task in the at least one asynchronous thread task irrelevant to display of a startup page of the application to be optimized;
- an adjustment module 203 is provided for adjusting the first priority parameter corresponding to the target thread task to obtain target codes of an optimized target application.

In one possible implementation, the initial codes also include a second priority parameter corresponding to the main thread task; wherein a priority order corresponding to a parameter value of the second priority parameter is higher than a priority order corresponding to a parameter value of the first priority parameter.

In one possible implementation, when determining, in the at least one asynchronous thread task, a target thread task irrelevant to display of a startup page of the application to be optimized, the determination module 202 is used for:

determining, for each of the at least one asynchronous thread task, a first startup result corresponding to the startup of the application to be optimized in a case of this asynchronous thread task being executed; and determining a second startup result corresponding to the startup of the application to be optimized in a case of this asynchronous thread task being not executed; wherein the first startup result and the second startup result characterize a speed for displaying the startup page;

determining, based on a first startup result and a second startup result corresponding to each of the at least one asynchronous thread task, the target thread task in the at least one asynchronous thread task.

In one possible implementation, when determining, in the at least one asynchronous thread task, a target thread task irrelevant to display of a startup page of the application to be optimized, the determination module 202 is used for:

in response to a select instruction for the target thread task in the at least one asynchronous thread task, determining a target thread task in the at least one asynchronous thread task.

In one possible implementation, when adjusting a first priority parameter corresponding to the target thread task, the adjustment module 203 is used for:

adjusting a parameter value of the first priority parameter corresponding to the target thread from a first target parameter value to a second target parameter value; wherein a priority order corresponding to the second target parameter value is lower than that of the first target parameter value.

In one possible implementation, while determining, based on a first startup result and a second startup result corresponding to each of the at least one asynchronous thread task, a target thread task in the at least one asynchronous thread task, the determination module 202 is used for:

determining, based on the first startup result and a second startup result corresponding to each of the at least one asynchronous thread task, the target thread task in the at least one asynchronous thread task and target impact information corresponding to the target thread task; wherein the target impact information characterizes a degree of impact of the target thread task on the application to be optimized;

wherein when adjusting the first priority parameter corresponding to the target thread task to obtain target codes of an optimized target application, the adjustment module 203 is used for:

adjusting, based on target impact information corresponding to each target thread task, a first priority parameter corresponding to each target thread task to obtain target codes of an optimized target application.

In one possible implementation, the target operating system is an iOS operating system, the computing resource is a time slice, and the first priority parameter is a Quality of Service parameter.

The apparatus for optimizing startup of an application provided by embodiments of the present disclosure determines, in the initial codes of the application to be optimized, a target thread task irrelevant to display of a startup page of the application to be optimized, such that a first priority parameter corresponding to the target thread task is adjusted and the target thread task irrelevant to the startup page of the application to be optimized would preempt fewer computing resources during the startup phase of the application to be optimized. Therefore, more computing resources are allocated to main thread tasks and the corresponding starting speed of the application to be optimized also increases, thereby obtaining target codes of an optimized target application.

The processing procedure of respective modules in the apparatus and interactive process between the respective modules may refer to the related description in the above method embodiments and will not be repeated here.

Figure 3:
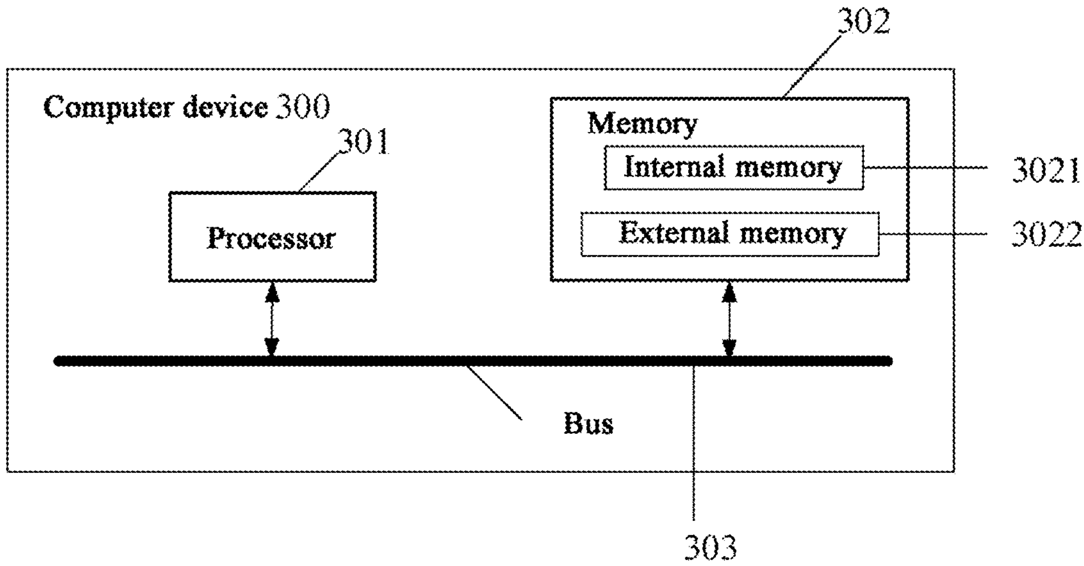
FIG. 3 illustrates a structural diagram of a computer device provided by embodiments of the present disclosure.

On the basis of the same inventive concept, embodiments of the present disclosure also provide a computer device. FIG. 3 illustrates a structural diagram of the computer device 300 provided by embodiments of the present disclosure, comprising: a processor 301, a memory 302 and a bus 303, wherein the memory 302 stores execution instructions and consists of an internal memory 3021 and an external memory 3022; the internal memory 3021 here is used for temporarily storing the operational data in the processor 301 and data exchanged with the external memory 3022 (such as hard disk and the like). The processor 301 exchanges data with the external memory 3022 through the internal memory 3021. During the operation of the computer device 300, the processor 301 communicates with the memory 302 through the bus 303, to enable the processor 301 to perform the following instructions of:

obtaining initial codes of an application to be optimized deployed in a target operating system; wherein the initial codes include a first priority parameter corresponding to at least one asynchronous thread task, the asynchronous thread task is other thread task executed upon startup of the application to be optimized other than a main thread task; and the first priority parameter characterizes a priority order for allocating computing resources;

determining, in the at least one asynchronous thread task, a target thread task irrelevant to display of a startup page of the application to be optimized;

adjusting the first priority parameter corresponding to the target thread task to obtain target codes of an optimized target application.

In one possible implementation, in the instructions of the processor 301, the initial codes also include a second priority parameter corresponding to the main thread task; wherein a priority order corresponding to a parameter value of the second priority parameter is higher than a priority order corresponding to a parameter value of the first priority parameter.

In one possible implementation, in the instructions of the processor 301, the determining, in the at least one asynchronous thread task, a target thread task irrelevant to display of a startup page of the application to be optimized includes:

for each of the at least one asynchronous thread task, determining a first startup result corresponding to the startup of the application to be optimized in a case of this asynchronous thread task being executed; and determining a second startup result corresponding to the startup of the application to be optimized in a case of this asynchronous thread task being not executed; wherein the first startup result and the second startup result characterize a speed for displaying the startup page;

determining, based on a first startup result and a second startup result corresponding to each of the at least one asynchronous thread task, the target thread task in the at least one asynchronous thread task.

In one possible implementation, in the instructions of the processor 301, the determining, in the at least one asynchronous thread task, a target thread task irrelevant to display of a startup page of the application to be optimized includes:

in response to a select instruction for a target thread task in the at least one asynchronous thread task, determining a target thread task in the at least one asynchronous thread task.

In one possible implementation, in the instructions of the processor 301, the adjusting the first priority parameter corresponding to the target thread task includes:

adjusting a parameter value of the first priority parameter corresponding to the target thread from a first target parameter value to a second target parameter value, wherein a priority order corresponding to the second target parameter value is lower than that of the first target parameter value.

In one possible implementation, in the instructions of the processor 301, the determining, based on a first startup result and a second startup result corresponding to each of the at least one asynchronous thread task, a target thread task in the at least one asynchronous thread task includes:

determining, based on the first startup result and the second startup result corresponding to each of the at least one asynchronous thread task, the target thread task in the at least one asynchronous thread task and target impact information corresponding to the target thread task; wherein the target impact information characterizes a degree of impact of respective target thread task on the application to be optimized;

wherein the adjusting the first priority parameter corresponding to the target thread task to obtain target codes of an optimized target application comprises:

adjusting, based on the target impact information corresponding to respective target thread task, the first priority parameter corresponding to respective target thread task to obtain target codes of the optimized target application.

In one possible implementation, in the instructions of the processor 301, the target operating system is iOS, the computing resource is time slice, and the first priority parameter is Quality of Service parameter.

Embodiments of the present disclosure also provide a computer-readable storage medium stored thereon with computer programs, wherein the computer programs, when operated by the processor, perform steps of the method for optimizing startup of applications in the above method embodiments. The storage medium may be volatile or non-volatile computer-readable storage medium.

Embodiments of the present disclosure further provide a computer program product carrying program codes; instructions included in the program codes may perform steps of the method for optimizing startup of applications in the above method embodiments. The details may refer to the above method embodiments and will not be elaborated here.

Wherein the above computer program product may be implemented by hardware, software or combinations thereof. In one optional embodiment, the computer program product is specifically embodied as computer storage medium. In a further alternative embodiment, the computer program product is specifically embodied as software product (e.g., Software Development Kit, SDK).

It may be clearly understood by those skilled in the art that, for sake of an easy and concise description, a detailed working process of the above described system and apparatus may refer to a corresponding process in the foregoing method embodiments. Details are not described herein again. In the several embodiments provided by the present disclosure, it should be understood that the disclosed system, apparatus and method may be implemented in other manners. The above described apparatus embodiment is merely an example. For example, the unit division is merely a division by logic function and there may be other dividing approaches in actual implementation. For another example, a plurality of units or components may be combined, or integrated into a further system. Alternatively, some features may be ignored or not performed. In addition, the displayed or discussed mutual couplings or direct couplings or communication links may be implemented through some interfaces. The indirect couplings or communication links between the apparatuses or units may be implemented in electrical, mechanical, or other forms.

The units described as discrete parts may or may not be physically separated, and parts displayed as units may or may not be physical units, i.e., they may be located at one position, or may be distributed over a plurality of network units. Some or all of the units may be selected based on actual requirements to fulfill the objectives of the solutions of the embodiments.

In addition, functional units in respective embodiments of the present disclosure may be integrated into one processing unit, or exist alone physically; alternatively, two or more units may be integrated into one unit.

The functions, when implemented in the form of software functional unit and sold or used as an independent product, may be stored in a non-volatile computer-readable storage medium executable by the processor. Based on such understanding, the technical solutions of the present disclosure essentially, or the part of the technical solutions contributing to the prior art, or some of the technical solutions may be implemented in the form of software product. The computer software product is stored in a storage medium, and includes several instructions for enabling a computer device (which may be a personal computer, a server, a network device, or the like) to perform all or some of the steps of the methods described in the embodiments of the present disclosure. The foregoing storage medium includes any medium that can store program codes, such as USB flash drive, mobile hard disk, Read-Only Memory (ROM), Random Access Memory (RAM), magnetic disk, or optical disc.

In the end, it should be noted that the above embodiments are merely specific implementations of the present disclosure and intended to explain the technical solutions of the present disclosure, rather than restricting them. The protection scope of the present disclosure is not restricted to this. Although the present disclosure is described in details with reference to the foregoing embodiments, those ordinary skilled in the art should understand that any technical personnel familiar with the technical field can still modify the technical solutions disclosed by the above embodiments or easily conceive of the changes of these technical solutions or equivalently substitute some of the technical features therein within the technical scope disclosed by the present disclosure. However, these modifications, changes or substitutions would not deviate the corresponding technical solutions from the spirit and scope of the technical solutions according to the embodiments of the present disclosure and instead should be encompassed within the protection scope of the present disclosure. Therefore, the protection scope of the present disclosure should be subject to the protection scope of the claims.

The invention claimed is:

1. A method for optimizing startup of an application, comprising:

obtaining, by a computer device, initial codes of an application to be optimized for being deployed in a target operating system of the computer device, wherein the initial codes include a first priority parameter corresponding to at least one asynchronous thread task, the at least one asynchronous thread task is other thread task executed upon startup of the application to be optimized other than a main thread task, and the first priority parameter characterizes a priority order for allocating computing resources;

determining, by the computer device based on startup results of the application to be optimized corresponding to the at least one asynchronous thread task, a target thread task irrelevant to display of a startup page of the application to be optimized in the at least one asynchronous thread task, comprising:

for an asynchronous thread task of the at least one asynchronous thread task, starting, by the computer device, the application to be optimized to determine a first startup result in a case of the asynchronous thread task being executed; and starting, by the computer device, the application to be optimized to determine a second startup result in a case of the asynchronous thread task being not executed, wherein the first startup result and the second startup result characterize a speed for displaying the startup page;

determining, by the computer device based on the first startup result and the second startup result corresponding to the asynchronous thread task, the target thread task in the at least one asynchronous thread task; and adjusting, by the computer device, the first priority parameter corresponding to the target thread task to obtain target codes of an optimized target application.

2. The method of claim 1, wherein the initial codes also include a second priority parameter corresponding to the main thread task, and wherein a priority order corresponding to a parameter value of the second priority parameter is higher than a priority order corresponding to a parameter value of the first priority parameter.

3. The method of claim 1, wherein adjusting the first priority parameter corresponding to the target thread task comprises:

adjusting a parameter value of the first priority parameter corresponding to the target thread task from a first target parameter value to a second target parameter value, wherein a priority order corresponding to the second target parameter value is lower than that of the first target parameter value.

4. The method of claim 1, wherein determining, by the computer device based on the first startup result and the second startup result corresponding to the at least one asynchronous thread task, the target thread task in the at least one asynchronous thread task comprises:

determining, based on the first startup result and the second startup result corresponding to each of the at least one asynchronous thread task, the target thread task in the at least one asynchronous thread task and target impact information corresponding to the target thread task, wherein the target impact information characterizes a degree of impact of the target thread task on the application to be optimized; and wherein adjusting, by the computer device, the first priority parameter corresponding to the target thread task to obtain the target codes of the optimized target application comprises:

adjusting, based on the target impact information corresponding to each target thread task, the first priority parameter corresponding to each target thread task to obtain the target codes of the optimized target application.

5. The method of claim 1, wherein the target operating system is an iOS operating system, the computing resource is a time slice, and the first priority parameter is a Quality of Service parameter.

6. A computer device, comprising: a processor, and a memory, wherein the memory stores machine-readable instructions which, when executed by the processor, cause the computer device to perform a method comprising:

obtaining initial codes of an application to be optimized for being deployed in a target operating system, wherein the initial codes include a first priority parameter corresponding to at least one asynchronous thread task, the at least one asynchronous thread task is other thread task executed upon startup of the application to be optimized other than a main thread task, and the first priority parameter characterizes a priority order for allocating computing resources;

determining, based on startup results of the application to be optimized corresponding to the at least one asynchronous thread task, a target thread task irrelevant to display of a startup page of the application to be optimized in the at least one asynchronous thread task, comprising:

for an asynchronous thread task of the at least one asynchronous thread task, starting the application to be optimized to determine a first startup result in a case of the asynchronous thread task being executed; and starting the application to be optimized to determine a second startup result in a case of the asynchronous thread task being not executed, wherein the first startup result and the second startup result characterize a speed for displaying the startup page;

determining, based on the first startup result and the second startup result corresponding to the asynchronous thread task, the target thread task in the at least one asynchronous thread task; and adjusting the first priority parameter corresponding to the target thread task to obtain target codes of an optimized target application.

7. The computer device of claim 6, wherein the initial codes also include a second priority parameter corresponding to the main thread task, and wherein a priority order corresponding to a parameter value of the second priority parameter is higher than a priority order corresponding to a parameter value of the first priority parameter.

8. The computer device of claim 6, wherein adjusting the first priority parameter corresponding to the target thread task comprises:

adjusting a parameter value of the first priority parameter corresponding to the target thread task from a first target parameter value to a second target parameter value, wherein a priority order corresponding to the second target parameter value is lower than that of the first target parameter value.

9. The computer device of claim 6, wherein determining, based on the first startup result and the second startup result corresponding to the asynchronous thread task, the target thread task in the at least one asynchronous thread task comprises:

determining, based on the first startup result and the second startup result corresponding to each of the at least one asynchronous thread task, the target thread task in the at least one asynchronous thread task and target impact information corresponding to the target thread task, wherein the target impact information characterizes a degree of impact of the target thread task on the application to be optimized; and wherein adjusting the first priority parameter corresponding to the target thread task to obtain the target codes of the optimized target application comprises:

adjusting, based on the target impact information corresponding to each target thread task, the first priority parameter corresponding to each target thread task to obtain the target codes of the optimized target application.

10. The computer device of claim 6, wherein the target operating system is an iOS operating system, the computing resource is a time slice, and the first priority parameter is a Quality of Service parameter.

11. A non-transitory computer-readable storage medium stored thereon with computer programs which, when executed by a processor of a device, cause the device to perform a method comprising:

obtaining, by the device, initial codes of an application to be optimized for being deployed in a target operating system of the device, wherein the initial codes include a first priority parameter corresponding to at least one asynchronous thread task, the at least one asynchronous thread task is other thread task executed upon startup of the application to be optimized other than a main thread task, and the first priority parameter characterizes a priority order for allocating computing resources;

determining, by the device based on startup results of the application to be optimized corresponding to the at least one asynchronous thread task, a target thread task irrelevant to display of a startup page of the application to be optimized in the at least one asynchronous thread task, comprising:

for an asynchronous thread task of the at least one asynchronous thread task, starting, by the device, the application to be optimized to determine a first startup result in a case of the asynchronous thread task being executed; and starting, by the device, the application to be optimized to determine a second startup result in a case of the asynchronous thread task being not executed, wherein the first startup result and the second startup result characterize a speed for displaying the startup page;

determining, by the device based on the first startup result and the second startup result corresponding to the asynchronous thread task, the target thread task in the at least one asynchronous thread task; and adjusting, by the device, the first priority parameter corresponding to the target thread task to obtain target codes of an optimized target application.

12. The non-transitory computer-readable storage medium of claim 11, wherein the initial codes also include a second priority parameter corresponding to the main thread task, and wherein a priority order corresponding to a parameter value of the second priority parameter is higher than a priority order corresponding to a parameter value of the first priority parameter.

13. The non-transitory computer-readable storage medium of claim 11, wherein adjusting, by the device, the first priority parameter corresponding to the target thread task comprises:

adjusting a parameter value of the first priority parameter corresponding to the target thread task from a first target parameter value to a second target parameter value, wherein a priority order corresponding to the second target parameter value is lower than that of the first target parameter value.

14. The non-transitory computer-readable storage medium of claim 11, wherein determining, by the device based on the first startup result and the second startup result corresponding to the asynchronous thread task, the target thread task in the at least one asynchronous thread task comprises:

determining, based on the first startup result and the second startup result corresponding to each of the at least one asynchronous thread task, the target thread task in the at least one asynchronous thread task and target impact information corresponding to the target thread task, wherein the target impact information characterizes a degree of impact of the target thread task on the application to be optimized; and wherein adjusting, by the device, the first priority parameter corresponding to the target thread task to obtain the target codes of the optimized target application comprises:

adjusting, based on the target impact information corresponding to each target thread task, the first priority parameter corresponding to each target thread task to obtain the target codes of the optimized target application.

* * * * *